United States Patent
Wei et al.

(10) Patent No.: US 10,958,581 B2
(45) Date of Patent: Mar. 23, 2021

(54) DATA TRANSMISSION METHOD AND COMMUNICATIONS APPARATUS

(71) Applicant: HUAWEI TECHNOLOGIES CO., LTD., Shenzhen (CN)

(72) Inventors: Anni Wei, Beijing (CN); Chunshan Xiong, Beijing (CN); Xinpeng Wei, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 367 days.

(21) Appl. No.: 15/933,316

(22) Filed: Mar. 22, 2018

(65) Prior Publication Data
US 2018/0212883 A1 Jul. 26, 2018

Related U.S. Application Data

(63) Continuation of application No. PCT/CN2015/090441, filed on Sep. 23, 2015.

(51) Int. Cl.
*H04L 12/801* (2013.01)
*H04L 29/06* (2006.01)
*H04L 12/707* (2013.01)
*H04L 29/08* (2006.01)

(52) U.S. Cl.
CPC ........... *H04L 47/193* (2013.01); *H04L 29/06* (2013.01); *H04L 45/24* (2013.01); *H04L 67/02* (2013.01); *H04L 69/14* (2013.01); *H04L 69/161* (2013.01); *H04L 69/163* (2013.01)

(58) Field of Classification Search
None
See application file for complete search history.

(56) References Cited

U.S. PATENT DOCUMENTS

| 2012/0226802 A1 | 9/2012 | Wu et al. |
| 2013/0232534 A1 | 9/2013 | Salkintzis et al. |
| 2015/0207834 A1 | 7/2015 | Zhao et al. |

(Continued)

FOREIGN PATENT DOCUMENTS

| CN | 102185771 A | 9/2011 |
| CN | 102404077 A | 4/2012 |

(Continued)

OTHER PUBLICATIONS

M. Belshe et al.,"Hypertext Transfer Protocol Version 2 (HTTP/2)",Request for Comments: 7540,Internet Engineering Task Force (IETF),May 2015,total 96 pages.

(Continued)

*Primary Examiner* — Jeffrey M Rutkowski
*Assistant Examiner* — Ning Li
(74) *Attorney, Agent, or Firm* — Kilpatrick Townsend & Stockton LLP (57) ABSTRACT

Embodiments of the present application provide a data transmission method and a communications apparatus. A Hypertext Transfer Protocol version 2 HTTP/2 adaptation layer is configured between an application layer and a Multipath Transmission Control Protocol MPTCP layer of a protocol stack. All frames belonging to a same HTTP/2 stream are allocated to a same MPTCP subflow for transmission, so that a data throughput is large, and system robustness is good, thereby improving HTTP/2 stream transmission performance.

19 Claims, 4 Drawing Sheets

S301: An HTTP/2 adaptation layer determines to match all HTTP/2 frames belonging to a same HTTP/2 stream to a same MPTCP subflow S302: An MPTCP layer adds, according to an instruction of the HTTP/2 adaptation layer, all the HTTP/2 frames belonging to the same HTTP/2 stream to one MPTCP subflow for transmission (56) References Cited

U.S. PATENT DOCUMENTS

| | | | | |
|---|---|---|---|---|
| 2017/0005705 A1* | 1/2017 | Casselman | ............ | H04L 5/0032 |
| 2017/0034283 A1* | 2/2017 | Moharana | ............... | H04L 69/16 |
| 2017/0181211 A1* | 6/2017 | Han | ..................... | H04L 47/122 |
| 2019/0215306 A1* | 7/2019 | Gopal | ................. | G06F 9/45558 |
| 2019/0238497 A1* | 8/2019 | Tourrilhes | ........... | H04L 12/5692 |

FOREIGN PATENT DOCUMENTS

| | | |
|---|---|---|
| CN | 103503357 A | 1/2014 |
| CN | 103597794 A | 2/2014 |

OTHER PUBLICATIONS

T. Berners-Lee et al.,"Hypertext Transfer Protocol—HTTP/1.0",Request for Comments: 1945,Network Working Group, May 1996,total 60 pages.

R. Fielding et al.,"Hypertext Transfer Protocol—HTTP/1.1",Request for Comments: 2616 Network Working Group, Jun. 1999,total 114 pages.

M. Scharf et al.,"Multipath TCP (MPTCP) Application Interface Considerations",Request for Comments: 6897,Internet Engineering Task Force (IETF),Mar. 2013,total 31 pages.

\* cited by examiner

S301: An HTTP/2 adaptation layer determines to match all HTTP/2 frames belonging to a same HTTP/2 stream to a same MPTCP subflow S302: An MPTCP layer adds, according to an instruction of the HTTP/2 adaptation layer, all the HTTP/2 frames belonging to the same HTTP/2 stream to one MPTCP subflow for transmission

FIG. 3

S3011: An HTTP/2 adaptation layer selects one MPTCP subflow according to address information of at least one MPTCP subflow, where the selected MPTCP subflow is used to carry all HTTP/2 frames belonging to a same HTTP/2 stream S3012: The HTTP/2 adaptation layer sends at least one HTTP/2 frame and address information of the selected MPTCP subflow to an MPTCP layer

DATA TRANSMISSION METHOD AND COMMUNICATIONS APPARATUS

CROSS-REFERENCE TO RELATED APPLICATIONS

This application is a continuation of International Application No. PCT/CN2015/090441, filed on Sep. 23, 2015, the disclosure of which is hereby incorporated by reference in its entirety.

TECHNICAL FIELD

Embodiments of the present application relate to the field of communications technologies, and in particular, to a data transmission method and a communications apparatus.

BACKGROUND

A Hypertext Transfer Protocol (HTTP) is an application-layer communication protocol between a client browser or another program and a Web (web) server, and uses a request/response model. As a user has an increasingly high requirement for network performance, various related application programs come into being. However, a conventional HTTP/1.0 or HTTP/1.1 (HTTP version 1) cannot meet running requirements of some application programs, and even has a negative effect.

HTTP/2 (HTTP version 2) efficiently uses a network resource and reduces a perceived delay by introducing header field compression and multiplexing. In a Transmission Control Protocol (TCP) connection, various to-be-transmitted frames are divided into multiple streams, and multiple HTTP request and response exchanges are allocated to each stream, so as to implement the foregoing multiplexing.

In the prior art, because multiple streams in an HTTP/2 TCP connection are multiplexed on a same TCP connection between a client and a server for transmission, a data throughput is limited. In addition, because an entire data transmission process depends on only one TCP connection, robustness needs to be improved.

SUMMARY

Embodiments of the present application provide a data transmission method and a communications apparatus, so as to increase an HTTP/2 data transmission throughput and improve system robustness.

According to a first aspect, an embodiment of the present application provides a data transmission method, and the method is applicable to a communications apparatus. A protocol stack of the communications apparatus includes an HTTP/2 adaptation layer and a Multipath Transmission Control Protocol (MPTCP) layer. The method includes: determining, by the HTTP/2 adaptation layer, to match all HTTP/2 frames belonging to a same HTTP/2 stream to a same MPTCP subflow; and adding, by the MPTCP layer according to an instruction of the HTTP/2 adaptation layer, all the HTTP/2 frames belonging to the same HTTP/2 stream to one MPTCP subflow for transmission, where an MPTCP connection to which the MPTCP subflow belongs has at least one MPTCP subflow.

The HTTP/2 adaptation layer is configured between an application layer and the MPTCP layer, and all the frames belonging to the same HTTP/2 stream are added to the same MPTCP subflow for transmission, so that a data throughput is increased and system robustness is good. Further, an intermediate parsing node on an MPTCP subflow between a client and a server can receive all frames belonging to a same HTTP/2 stream, thereby completing HTTP/2 service parsing processing.

In a possible implementation, the method further includes: identifying, by the HTTP/2 adaptation layer according to stream identifiers carried by the received HTTP/2 frames, whether the HTTP/2 frames belong to the same HTTP/2 stream, where frames belonging to a same HTTP/2 stream have a same stream identifier.

In a possible implementation, the method further includes: performing, by the HTTP/2 adaptation layer by using an interface between the HTTP/2 adaptation layer and the MPTCP layer, an information exchange to obtain subflow information of at least one MPTCP subflow that belongs to the MPTCP connection, where the subflow information identifies the MPTCP subflow.

In a possible implementation, the subflow information obtained by the HTTP/2 adaptation layer includes at least an MPTCP subflow identifier; the MPTCP subflow identifier may include address information of an MPTCP subflow; the HTTP/2 adaptation layer selects one MPTCP subflow according to address information of the at least one MPTCP subflow that belongs to the same MPTCP connection, where the selected MPTCP subflow carries all the HTTP/2 frames belonging to the same HTTP/2 stream; and sends the HTTP/2 frames and address information of the selected MPTCP subflow to the MPTCP layer; and the MPTCP layer adds all the HTTP/2 frames belonging to the same HTTP/2 stream to the selected MPTCP subflow for transmission.

In a possible implementation, the subflow information obtained by the HTTP/2 adaptation layer includes at least a quantity of MPTCP subflows. The HTTP/2 adaptation layer separately allocates one MPTCP subflow identification number to each MPTCP subflow of the corresponding quantity of MPTCP subflows, where the MPTCP subflow identification number indicates a distinction between different MPTCP subflows, makes all the HTTP/2 frames belonging to the same HTTP/2 stream correspond to one MPTCP subflow identifier, and sends the HTTP/2 frames and the corresponding MPTCP subflow identification number to the MPTCP layer; and the MPTCP layer selects one MPTCP subflow to correspond to the MPTCP subflow identification number, and allocates all the HTTP/2 frames belonging to the same HTTP/2 stream to the MPTCP subflow corresponding to the MPTCP identification number for transmission.

The HTTP/2 adaptation layer may allocate, by using the quantity of MPTCP subflows or identifier information of the MPTCP subflows of the MPTCP connection, all the HTTP/2 frames belonging to the same HTTP/2 stream to the same MPTCP subflow.

In a possible implementation, the HTTP/2 adaptation layer identifies an HTTP/2 stream and non-HTTP/2 data, and transparently transmits the non-HTTP/2 data to the MPTCP layer; the MPTCP layer determines to allocate the non-HTTP/2 data to an MPTCP subflow for transmission; or while transparently transmitting the non-HTTP/2 data to the MPTCP layer, the HTTP/2 adaptation layer sends an indication message to the MPTCP layer to instruct to allocate the non-HTTP/2 data to an MPTCP subflow.

According to another aspect, an embodiment of the present application provides a communications apparatus, and the communications apparatus has a function that implements the foregoing method. The function may be implemented by hardware, or may be implemented by executing corresponding software by hardware. The hardware or the software includes one or more modules corresponding to the foregoing function.

In a possible implementation, a structure of the communications apparatus includes a processor and a memory. The processor is configured to support the communications apparatus in executing a corresponding function in the foregoing method. The memory is configured to couple to the processor. The memory stores necessary program instructions and data of a base station. The communications apparatus may further include a communications interface, configured to support the communications apparatus in communicating with another communications apparatus.

According to a still another aspect, an embodiment of the present application provides a non-volatile computer storage medium, configured to store a computer software instruction used by the foregoing communications apparatus, and the instruction includes a program that is designed to execute the foregoing aspects.

According to a yet another aspect, an embodiment of the present application provides a computer software product stored in a storage medium. The computer software product includes several instructions used to make a computer device perform the data transmission method provided in the foregoing aspects.

According to the technical solutions provided in the embodiments of the present application, a prior-art problem that a data throughput is low and system robustness is poor because HTTP/2 stream multiplexing transmission is performed depending on only one TCP connection is resolved, thereby improving HTTP/2 stream transmission performance.

DESCRIPTION OF EMBODIMENTS

To make the objectives, technical solutions, and advantages of the present application clearer, the following further describes implementations of the present application in detail with reference to the accompanying drawings.

Technologies described in this specification may be applied to various communications systems, for example, 2G and 3G communications systems and a next generation communications system, such as a Global System for Mobile Communications (GSM), a Code Division Multiple Access (CDMA) system, a Time Division Multiple Access (TDMA) system, a Wideband Code Division Multiple Access (WCDMA) system, a Long Term Evolution (LTE) system and a subsequent evolved system; and other wireless broadband access networks such as a wireless local area network (WLAN) and a Worldwide Interoperability for Microwave Access (WiMax) system, and fixed networks.

It should be noted that, a base station device described in embodiments of the present application may be, for example, a base transceiver station (BTS) in GSM or CDMA, a NodeB in WCDMA, an evolved NodeB (eNodeB) in LTE, an access point (AP) in WLAN, or a network element with a similar function in another communications system or wireless network system. This is not limited in the embodiments of the present application.

A base station control device described in the embodiments of the present application may be, for example, a base station controller (BSC) in GSM or CDMA, a radio network controller (RNC) in WCDMA, an access controller (AC) in WLAN, or another network element with a similar function. This is not limited in the embodiments of the present application.

A client described in the embodiments of the present application may be user equipment (UE), including user equipment that accesses an access network to perform data transmission in a wireless manner, for example, a mobile phone, a mobile terminal, a personal computer with a wireless communication function, or another similar terminal device with a data communication function.

A server described in the embodiments of the present application may be various devices that communicate with a client such as a server, a base station device, or a base station control device. This is not limited in the embodiments of the present application.

It should be noted that the access network described in the embodiments of the present application includes a radio access network (RAN) constituted by devices such as a BTS and a BSC, a NodeB and an RNC, or an e-NodeB; and a broadband access network constituted by devices such as an AP and an AC. The AC and the RNC may be integrated, that is, a function of the AC is integrated into the RNC, and the RNC communicates with the AP.

Figure 1:
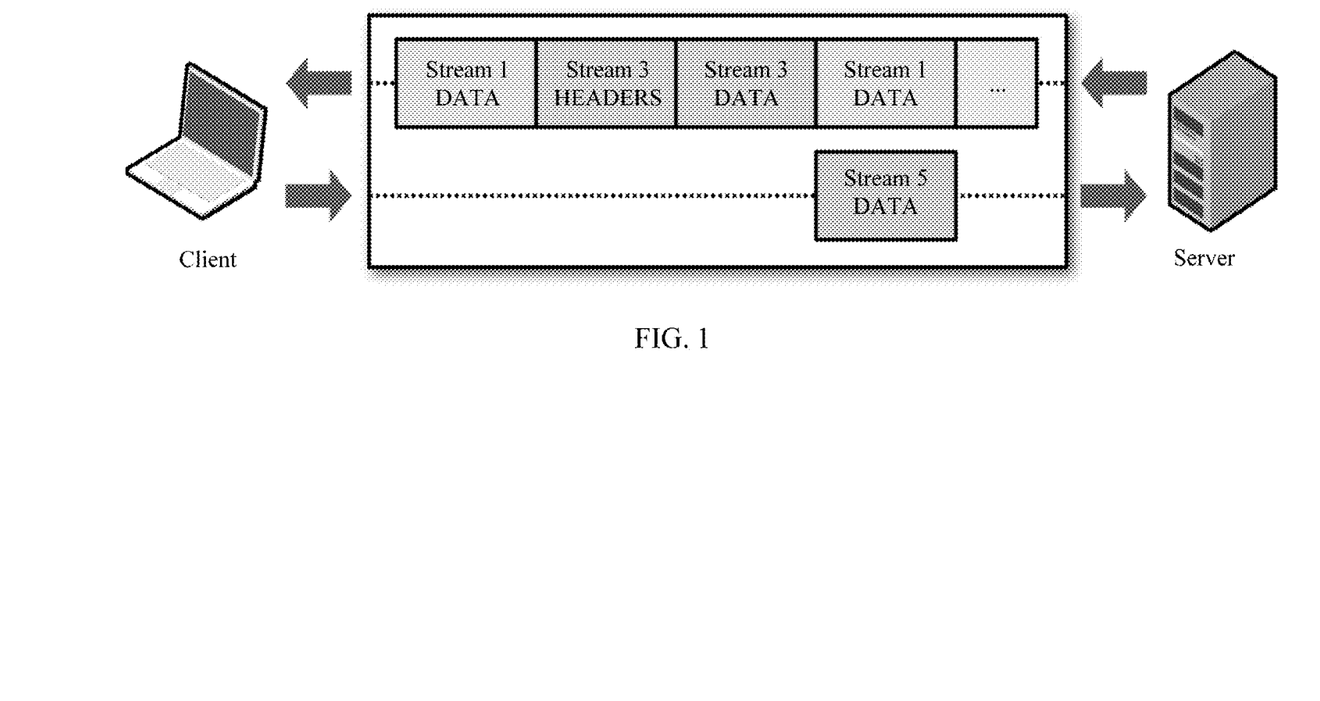
FIG. 1 is a schematic diagram of an HTTP/2 stream transmission process.

FIG. 1 is a schematic diagram of an HTTP/2 stream transmission process.

An HTTP/2 stream (or referred to as a "stream") described in an embodiment of the present application is a bidirectional sequence in which a client and a server exchange frames within an HTTP/2 connection. The frame is a basic protocol unit in HTTP/2. Each frame has a different type and usage. For example, a header frame and a data frame constitute a basic HTTP request and response. Another frame such as a setting frame, a window_update frame, or a push_promise frame is used to implement another function of HTTP/2. A major structure and content of a frame depend on a frame type. Particularly, a header field of a frame that includes an HTTP header field in HTTP/2 is compressed, so that sizes of the request and the response can be significantly reduced. In this embodiment of the present application, a frame in the HTTP stream is an HTTP/2 frame, or referred to as a frame.

As shown in FIG. 1, in an HTTP/2 connection process, multiple independent HTTP/2 streams including a stream 1, a stream 3, and a stream 5 are transmitted in a same TCP connection. The stream 1 includes a data frame. The stream 3 includes a header frame and a data frame. The stream 5 includes a data frame. The data frame of the stream 1, and the header frame and the data frame of the stream 3 are sent to the client by the server. The data frame of the stream 5 is sent to the server by the client. It can be learned from FIG. 1 that frames in a same HTTP/2 stream may be continuously transmitted, for example, the stream 3, or may be discontinuously transmitted, for example, the stream 1. It can be understood that an HTTP/2 stream may include one or more frame types of data frame, control frame, and header frame. FIG. 1 is merely an example, and can not constitute any limitation on a frame type or a frame quantity included in the HTTP/2 stream.

It can be learned from FIG. 1 that one HTTP/2 connection can keep multiple simultaneously-enabled streams, and two communication parties can exchange frames in the multiple streams. Frames in each HTTP/2 stream are sent in a time sequence. A sending order of each frame determines an order in which the frame is received and processed. Particularly, orders of the header frame and the data frame semantically determine that a receive end first processes the header frame and then processes the data frame, for example, a sending order of the header frame and the data frame in the stream 3 shown in FIG. 1.

Each HTTP/2 stream has a stream identifier. A stream identifier is allocated by a communication party that enables an HTTP/2 stream. All frames in a same HTTP/2 stream carry a same stream identifier. The HTTP/2 stream may be unilaterally established and used, or shared by the client or the server; and may be disabled by any communication party.

As shown in FIG. 1, multiple HTTP/2 streams in each HTTP/2 connection are transmitted on a same TCP connection. Therefore, a data throughput is limited. In addition, when the TCP connection is faulty, transmission of the HTTP/2 stream is interrupted, and transmission efficiency is affected. Therefore, in this embodiment of the present application, an MPTCP-related technology is applied to the transmission of the HTTP/2 stream, and MPTCP is used to optimize the transmission of the HTTP/2 stream. Further, if frames of a same HTTP/2 stream are randomly transmitted on MPTCP subflows of an MPTCP connection, an intermediate parsing node on the MPTCP subflow between the client and the server cannot receive all frames belonging to a same HTTP/2 stream, and HTTP/2 service parsing processing cannot be completed. The intermediate parsing node may be any communications device in the MPTCP connection, for example, a router, a base station device, or a base station control device. This is not particularly limited in this embodiment of the present application.

Figure 2A:
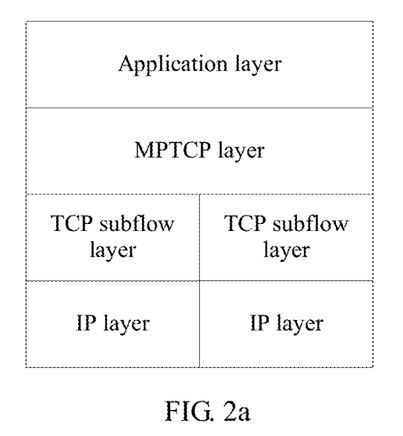
FIG. 2a is a schematic diagram of an MPTCP protocol stack.

MPTCP is derived based on a conventional TCP protocol, and can be used to provide end-to-end multilink communication for a user terminal, so that data streams are distributed to multiple links in a resource sharing manner, thereby increasing a network bandwidth. FIG. 2a is a schematic diagram of an MPTCP protocol stack. Compared with a standard TCP, the MPTCP protocol stack mainly divides a TCP layer into an MPTCP layer and a TCP subflow layer, and implements concurrent data transmission in the following manner. The manner includes: establishing multiple MPTCP subflows, which is equivalent to establishing multiple TCP connections; and performing data splitting or convergence processing on the multiple MPTCP subflows by the MPTCP layer. An MPTCP subflow may be connected, by using a token, to an MPTCP connection to which the MPTCP subflow belongs. The token is an identifier of the MPTCP connection, and is unique and can be identified only in a local protocol stack. Both an initiating end and a responding end in an initial MPTCP connection establishment process need to generate one token. The token may be considered as an MPTCP connection identifier (MPTCP Connection ID).

The MPTCP connection includes multiple MPTCP subflows. The MPTCP subflow is a TCP data stream that is transmitted on a specific transmission path. The transmission path is a channel that exists between two communication parties of the MPTCP connection, and may be identified by using a pair of addresses of the two communication parties, for example, IP addresses of the two communication parties or IP addresses and port numbers of the two communication parties. Each MPTCP subflow has a corresponding path. The two communication parties of the MPTCP connection may be communication devices on two ends in an air interface uplink or air interface downlink data transmission process, for example, a client and a server. Either of the two communication parties can initiate or respond to a related process of the MPTCP connection, including an initial MPTCP connection establishment process, a subflow establishment process, a subflow deletion process, a subflow priority update process, or the like. For example, UE that accesses a radio access point initiates the initial MPTCP connection establishment process, and a server on a network side responds to the process. In this case, the UE and the server are two communication parties of the MPTCP connection. Similarly, the server may initiate the initial MPTCP connection establishment process, and the UE responds to the process.

Because MPTCP is an end-to-end protocol, the two communication parties need to exchange control signaling to complete a function such as the foregoing initial MPTCP connection establishment, TCP subflow addition or deletion, and address notification. The control signaling is transmitted by using a TCP option.

Figure 2B:
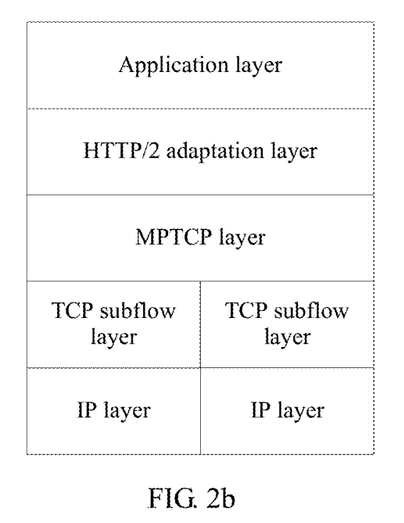
FIG. 2b is a schematic diagram of a protocol stack according to an embodiment of the present application.

FIG. 2b is a schematic diagram of a protocol stack according to an embodiment of the present application. According to a data transmission method in this embodiment of the present application, an HTTP/2 adaptation layer is inserted between an application layer and an MPTCP layer, and used to identify an HTTP/2 stream. In this way, all frames belonging to a same HTTP/2 stream are transmitted on a same MPTCP subflow, so that an intermediate parsing node on an MPTCP subflow between a client and a server can receive all frames in one HTTP/2 stream, thereby completing HTTP/2 service parsing processing.

Figure 3:
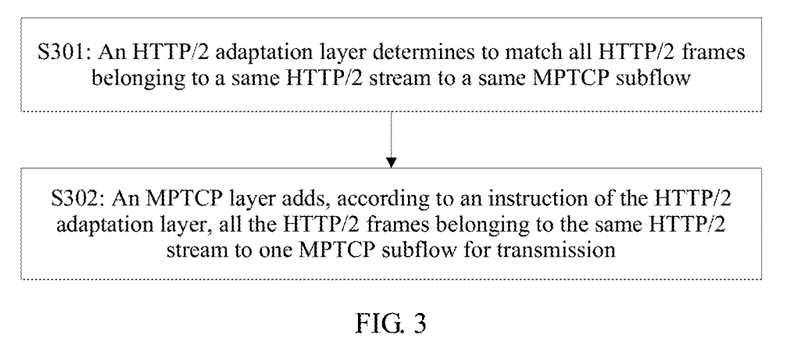
FIG. 3 is a schematic flowchart of a data transmission method according to an embodiment of the present application.

As shown in FIG. 3, an embodiment of the present application provides a data transmission method that is applicable to a communications apparatus. A protocol stack of the communications apparatus includes an HTTP/2 adaptation layer and an MPTCP layer.

The communications apparatus may be used as a client or a server to perform data communication with a peer.

The data transmission method includes steps S301 and S302.

S301: An HTTP/2 adaptation layer determines to match all HTTP/2 frames belonging to a same HTTP/2 stream to a same MPTCP subflow.

Specifically, the HTTP/2 adaptation layer may be configured between an application layer and the MPTCP layer of the protocol stack. The HTTP/2 adaptation layer may be used to identify an HTTP/2 stream and match an HTTP/2 frame with an MPTCP subflow.

S302: The MPTCP layer adds, according to an instruction of the HTTP/2 adaptation layer, all the HTTP/2 frames belonging to the same HTTP/2 stream to one MPTCP subflow for transmission, where an MPTCP connection to which the MPTCP subflow belongs has at least one MPTCP subflow.

Optionally, in an embodiment of the present application, the HTTP/2 adaptation layer may send a message that carries an HTTP/2 frame and corresponding subflow indication information (subflow_indication) to the MPTCP layer. The MPTCP layer allocates the HTTP/2 frame to one MPTCP subflow for transmission according to the subflow indication information, and further allocates, according to the same subflow indication information, all the frames belonging to the same HTTP/2 stream to one MPTCP subflow for transmission.

Optionally, before S301, the method may further include step S300a: The HTTP/2 adaptation layer identifies, according to a stream identifier carried by an HTTP/2 frame, an HTTP/2 stream to which the HTTP/2 frame belongs.

The HTTP/2 frame is transmitted to the HTTP/2 adaptation layer from the application layer.

Optionally, the stream identifier may be a stream identifier (Stream ID) in a header field of the HTTP/2 frame. Using the stream identifier indicates that the HTTP/2 frame belongs to a consecutive HTTP/2 stream, and is not transmitted independently. HTTP/2 frames belonging to a same HTTP/2 stream have a same stream identifier. A length of the stream identifier may be 31 bytes.

Optionally, before S301, the method may further include step S300b: The HTTP/2 adaptation layer obtains, by using an interface between the HTTP/2 adaptation layer and the MPTCP layer, subflow information of at least one MPTCP subflow of the MPTCP connection, where the subflow information identifies the at least one MPTCP subflow.

Specifically, an information exchange between the HTTP/2 adaptation layer and the MPTCP layer may be performed by using the interface such as a socket (Socket) interface. The MPTCP layer may send subflow information of each MPTCP subflow to the HTTP/2 adaptation layer by using the socket interface.

It should be noted that, when the data transmission method provided in this embodiment of the present application includes both steps S300a and S300b, an execution order of steps S300a and S300b is not particularly limited in this embodiment of the present application. That is, S300a may be performed before S300b; S300b may be performed before S300a; or S300a and S300b may be simultaneously performed.

According to the data transmission method provided in this embodiment of the present application, based on the stream identifier of the HTTP/2 stream and the subflow information of the at least one MPTCP subflow of the MPTCP connection, all the frames belonging to the same HTTP/2 stream are allocated to the same MPTCP subflow for transmission, so that a data throughput is large, and system robustness is good, thereby improving HTTP/2 stream transmission performance.

Optionally, in an embodiment of the present application, the subflow information that is of the MPTCP subflow and that is obtained by the HTTP/2 adaptation layer includes at least an MPTCP subflow identifier.

Optionally, the MPTCP subflow identifier may include address information of an MPTCP subflow.

Optionally, the address information of the MPTCP subflow may be a port number and an IP address of two communication parties or IP addresses of two communication parties of the MPTCP connection. Each MPTCP subflow of the MPTCP connection has a different address, that is, the address information can be used to indicate the MPTCP subflow.

Figure 4:
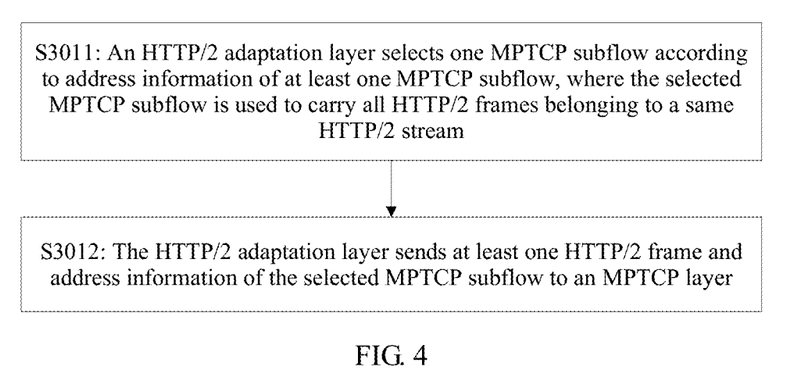
FIG. 4 is a detailed schematic flowchart of step S301 in a data transmission method according to an embodiment of the present application.

Optionally, when the subflow information obtained by the HTTP/2 adaptation layer includes at least the MPTCP subflow identifier, S301 specifically includes steps S3011 and S3012 shown in FIG. 4.

S3011: The HTTP/2 adaptation layer selects one MPTCP subflow according to address information of the at least one MPTCP subflow, where the selected MPTCP subflow carries all the HTTP/2 frames belonging to the same HTTP/2 stream.

S3012: The HTTP/2 adaptation layer sends the HTTP/2 frames and address information of the selected MPTCP subflow to the MPTCP layer.

Specifically, the HTTP/2 adaptation layer can identify, according to a stream identifier carried by an HTTP/2 frame, an HTTP/2 stream to which the HTTP/2 frame belongs; and obtain a subflow quantity of the MPTCP connection and a path of each MPTCP subflow according to address information of an MPTCP subflow, so as to select one MPTCP subflow from multiple MPTCP subflows; and further instruct the MPTCP layer to allocate all the HTTP/2 frames belonging to the same HTTP/2 stream to the selected MPTCP subflow for transmission.

Optionally, in this embodiment, subflow indication information sent to the MPTCP layer from the HTTP/2 adaptation layer may be address information of one MPTCP subflow selected by the HTTP/2 layer. In this case, after obtaining the subflow indication information, the MPTCP layer may allocate an HTTP/2 frame corresponding to the subflow indication information to the MPTCP subflow that matches the address information for transmission.

It can be understood that the HTTP/2 adaptation layer matches all the frames in the same HTTP/2 stream with address information of the same MPTCP subflow according to stream identifiers carried by the HTTP/2 frames. Therefore, subflow indication information corresponding to all the frames in the same HTTP/2 stream is same. The MPTCP layer may allocate, according to the same subflow indication information, all the HTTP/2 frames belonging to the same HTTP/2 stream to the same MPTCP subflow.

Correspondingly, in this embodiment, S302 is specifically as follows: The MPTCP layer adds all the HTTP/2 frames belonging to the same HTTP/2 stream to the selected MPTCP subflow for transmission.

Optionally, in another embodiment of the present application, the subflow information that is of the MPTCP subflow and that is obtained by the HTTP/2 adaptation layer includes at least a quantity of MPTCP subflows.

Figure 5:
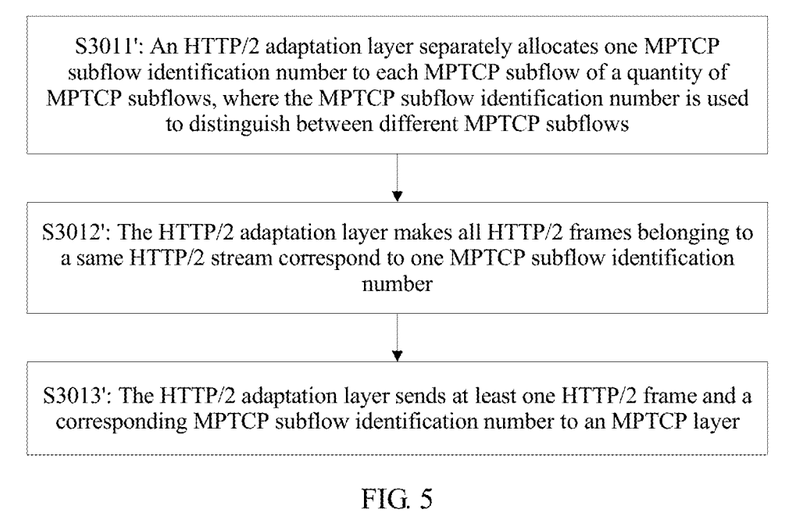
FIG. 5 is a detailed schematic flowchart of step S301 in a data transmission method according to an embodiment of the present application.

When the subflow information includes at least the quantity of MPTCP subflows, S301 specifically includes steps 3011' to S3013' shown in FIG. 5.

S3011': The HTTP/2 adaptation layer separately allocates one MPTCP subflow identification number to each MPTCP subflow of the quantity of MPTCP subflows, where the MPTCP subflow identification number indicates a distinction between different MPTCP subflows.

Specifically, the MPTCP subflow identification number indicates a distinction between multiple MPTCP subflows belonging to a same MPTCP connection. Optionally, different symbols such as a letter, a number, or a character may be used to identify each MPTCP subflow.

S3012': The HTTP/2 adaptation layer makes all the HTTP/2 frames belonging to the same HTTP/2 stream correspond to one MPTCP subflow identification number.

S3013': The HTTP/2 adaptation layer sends the HTTP/2 frames and the corresponding MPTCP subflow identification number to the MPTCP layer.

Optionally, in this embodiment, subflow indication information sent to the MPTCP layer from the HTTP/2 adaptation layer may be the MPTCP subflow identification number. Specifically, when MPTCP subflow information obtained by the HTTP/2 adaptation layer is quantity information of the MPTCP subflows of the same MPTCP connection, the HTTP/2 adaptation layer can determine that the MPTCP connection includes how many different MPTCP subflows, distinguish between the MPTCP subflows by using different MPTCP subflow identification numbers, and further send a message that carries an HTTP/2 frame and an MPTCP subflow identification number to the MPTCP layer. The MPTCP layer determines a specific MPTCP subflow for transmitting the HTTP/2 frame. It can be understood that, all frames belonging to a same HTTP/2 stream correspond to a same MPTCP identification number, and the MPTCP layer may allocate all the HTTP/2 frames in the same HTTP/2 stream to a same MPTCP subflow according to the identification number.

Correspondingly, in this embodiment, S302 specifically includes the following: The MPTCP layer selects one MPTCP subflow to correspond to the MPTCP subflow identification number; and allocates all the HTTP/2 frames belonging to the same HTTP/2 stream to the MPTCP subflow corresponding to the MPTCP identification number for transmission.

A selection manner of the MPTCP subflow is not particularly limited in this embodiment of the present application. For example, the HTTP/2 adaptation layer or the MPTCP layer may randomly select an MPTCP subflow to transmit the HTTP/2 frame, or may select, according to a load situation of each MPTCP subflow, an MPTCP subflow with relatively low load to transmit the HTTP/2 frame.

An HTTP/2 stream transmission process in this embodiment of the present application is described below by using an example. It is assumed that the HTTP/2 adaptation layer determines, according to the quantity information of the MPTCP subflow, that one MPTCP connection has three MPTCP subflows including a subflow 1, a subflow 2, and a subflow 3. Labels 1 to 3 are used to distinguish between the subflow 1, the subflow 2, and the subflow 3, and not used to particularly represent specific MPTCP subflows. The HTTP/2 adaptation layer may add, to a message, an HTTP/2 frame and subflow indication information (subflow_indication) that indicates any one of the subflow 1, the subflow 2, and the subflow 3, and send the message to the MPTCP layer. A value of subflow_indication may be 1, 2, or 3. Afterward, the MPTCP layer determines a specific MPTCP subflow corresponding to the subflow 1, the subflow 2, or the subflow 3, and allocates an HTTP/2 frame belonging to the subflow 1, the subflow 2, or the subflow 3 to the corresponding MPTCP subflow for transmission. Each specific MPTCP subflow may be identified by IP addresses of two communication parties.

Optionally, a format of the message may be (buf, subflow_indication, . . . ). The parameter buf represents data sent to the MPTCP layer by the HTTP/2 adaptation layer, that is, the HTTP/2 frame in this embodiment of the present application. The message may be sent by using the socket interface, and subflow_indication represents the subflow indication information.

It can be understood that, multiple HTTP/2 streams may be simultaneously transmitted between the two communication parties, and the HTTP/2 streams may be distributed on different MPTCP subflows for transmission. In addition, because there are multiple MPTCP subflows, when an MPTCP subflow of the multiple MPTCP subflows is faulty, an HTTP/2 stream on this MPTCP subflow may be transferred to another MPTCP subflow in time for transmission, thereby improving system robustness.

In a specific application scenario of this embodiment of the present application, an HTTP/2 adaptation layer and an MPTCP layer are separately configured in protocol stacks of a host (host) A and a host B. There are two MPTCP subflows between the host A and the host B: a subflow 1 and a subflow 2. The subflow 1 may be identified by a pair of IP addresses (A2; B1) of the host A and the host B. The subflow 2 may be identified by another pair of IP addresses (A2; B1) of the host A and the host B. There are four HTTP/2 streams transmitted between the host A and the host B: a stream 1, a stream 2, a stream 3, and a stream 4. Corresponding stream identifiers are respectively 1, 2, 3, and 4. It is assumed that each HTTP/2 stream has two HTTP/2 frames: a frame 1 and a frame 2, and a type of the HTTP/2 frame is not limited. The HTTP/2 adaptation layer may determine, by identifying a stream identifier of an HTTP/2 frame, an HTTP/2 stream to which the HTTP/2 frame belongs, and instructs the MPTCP layer to separately allocate all frames in the stream 1 and the stream 4 to the subflow 2 for transmission and allocate all frames in the stream 2 and the stream 3 to the subflow 1 for transmission, so as to implement HTTP/2 service splitting. It can be understood that the example cannot be construed as any limitation on this embodiment of the present application.

In practical application, a header frame and a data frame in an HTTP/2 stream constitute a basic HTTP request and response. Because a stream identifier of a header frame is the same as a stream identifier of a data frame in a same HTTP/2 stream, the HTTP/2 adaptation layer may allocate the header frame and the data frame to a same MPTCP subflow for transmission by identifying the stream identifiers, so that a request and a response of a same HTTP/2 stream can be made on one MPTCP subflow. In this way, an intermediate parsing node on the MPTCP subflow can obtain all information of the HTTP/2 stream from one MPTCP subflow, so as to complete parsing of the HTTP/2 stream, thereby implementing processing of different MPTCP subflow services, including subsequent data transmission, service optimization, charging, and the like.

Figure 6:
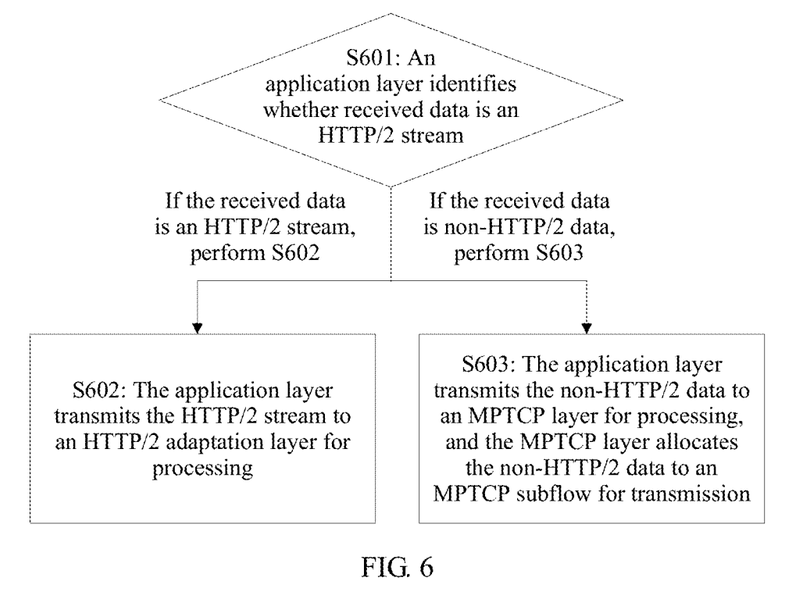
FIG. 6 is a schematic flowchart of another data transmission method according to an embodiment of the present application.

FIG. 6 is a schematic flowchart of another data transmission method according to an embodiment of the present application. The method may be applied to a client or a server.

S601: An application layer identifies whether received data is an HTTP/2 stream and performs S602 if the data is an HTTP/2 stream, or performs S603 if the data is a non-HTTP/2 stream.

The non-HTTP/2 stream is data that is transmitted not in a format specified by HTTP/2.

Optionally, the application layer may determine, according to a frame format of the received data, whether the data is an HTTP/2 stream. For the HTTP/2 frame format, refer to a related description of another embodiment of the present application. Details are not described herein.

S602: The application layer transmits the HTTP/2 stream to an HTTP/2 adaptation layer for processing.

S603: The application layer transmits the non-HTTP/2 stream to an MPTCP layer for processing, and the MPTCP layer determines to allocate the non-HTTP/2 stream to an MPTCP subflow for transmission.

A process of processing the HTTP/2 stream by the HTTP/2 adaptation layer includes S6021 to S6024.

S6021: The HTTP/2 adaptation layer identifies the HTTP/2 stream by using a stream identifier.

S6022: The HTTP/2 adaptation layer obtains information about the MPTCP subflow from the MPTCP layer by using a socket interface.

Optionally, the HTTP/2 adaptation layer may receive a TCP_MULTIPATH_CONNID message sent by the MPTCP layer by using the socket interface, so as to obtain a quantity of MPTCP subflows. Alternatively, the HTTP/2 adaptation layer may receive a TCP_MULTIPATH_SUBFLOWS message to obtain a list of pairs of addresses of MPTCP subflows. The list of pairs of addresses may include information such IP addresses and port numbers of two communication parties of MPTCP subflows that belong to a same MPTCP connection.

S6023: The HTTP/2 adaptation layer matches all frames belonging to the HTTP/2 stream with a same MPTCP subflow.

S6024: The HTTP/2 adaptation layer sends the HTTP/2 stream and corresponding subflow indication information to the MPTCP layer, and the MPTCP layer allocates the HTTP/2 stream to a specific MPTCP subflow for transmission.

For a detailed description of an HTTP/2 stream processing process, refer to related content of another embodiment of the present application. Details are not described herein.

Optionally, the MPTCP layer may determine to transmit an MPTCP subflow of the non-HTTP/2 data, which includes: allocating the non-HTTP/2 data to an MPTCP subflow on which the HTTP/2 stream is transmitted for transmission; or allocating the non-HTTP/2 data to an MPTCP subflow on which the HTTP/2 stream is not transmitted for transmission. This is not particularly limited in this embodiment of the present application.

The MPTCP layer may determine to allocate the non-HTTP/2 data to one MPTCP subflow or different MPTCP subflows. For a specific allocation process and a transmission process of the non-HTTP/2 data on the MPTCP subflow, refer to related content in the prior art. Details are not described herein.

In another implementation of the present application, the application layer may transmit all the received data to the HTTP/2 adaptation layer. The HTTP/2 adaptation layer identifies the HTTP/2 stream and the non-HTTP/2 data, and transparently transmits the non-HTTP/2 data to the MPTCP layer. The MPTCP layer allocates the non-HTTP/2 data to the MPTCP subflow for transmission.

Optionally, while transparently transmitting the non-HTTP/2 data to the MPTCP layer, the HTTP/2 adaptation layer may send an indication message to the MPTCP layer to instruct to allocate the non-HTTP/2 data to an MPTCP subflow for transmission. For specific content of the indication message, refer to a description of transmitting subflow indication information of the HTTP/2 stream in another embodiment of the present application. Details are not described herein.

According to the data transmission method provided in this embodiment of the present application, by distinguishing between the HTTP/2 stream and the non-HTTP/2 data, the HTTP/2 adaptation layer instructs, according to the stream identifier of the HTTP/2 stream and information about at least one MPTCP subflow of a same MPTCP connection, the MPTCP layer to allocate all frames belonging to a same HTTP/2 stream to a same MPTCP subflow for transmission, so as to increase a data throughput and system robustness; and transparently transmits the non-HTTP/2 data to the MPTCP layer for processing, so as to save a processing resource of the HTTP/2 adaptation layer. Further, an intermediate parsing node on an MPTCP subflow between a client and a server can receive all frames belonging to a same HTTP/2 stream, thereby completing HTTP/2 service parsing processing.

Figure 7:
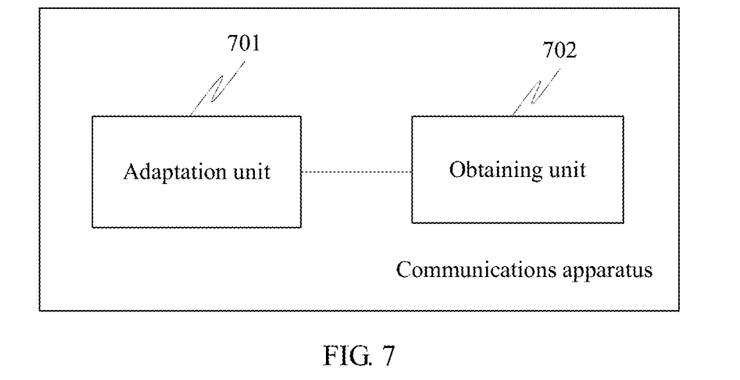
FIG. 7 is a schematic structural diagram of a communications apparatus according to an embodiment of the present application.

FIG. 7 is a schematic structural diagram of a communications apparatus according to an embodiment of the present application. The apparatus is configured to communicate with a peer apparatus, and includes an adaptation unit 701 and a transmission unit 702.

The adaptation unit 701 is configured to determine to match all HTTP/2 frames belonging to a same HTTP/2 stream to a same MPTCP subflow.

The transmission unit 702 is configured to add, according to an instruction of the adaptation unit 701, all the HTTP/2 frames belonging to the same HTTP/2 stream to one MPTCP subflow for transmission, where an MPTCP connection to which the MPTCP subflow belongs has at least one MPTCP subflow.

Optionally, in an implementation of the present application, the adaptation unit 701 is specifically configured to identify, according to stream identifiers carried by the HTTP/2 frames, that all the HTTP/2 frames belong to the same HTTP/2 stream.

Optionally, the adaptation unit 701 is further configured to obtain, by using an interface between the adaptation unit 701 and the transmission unit 702, subflow information of at least one MPTCP subflow that belongs to the MPTCP connection, where the subflow information identifies the at least one MPTCP subflow.

Optionally, the interface in this embodiment of the present application may be an interface between software modules, that is, may be implemented in a software manner; or may be an interface that is between hardware modules and that is implemented by using a circuit. This is not particularly limited in this embodiment of the present application.

Optionally, in an embodiment of the present application, the subflow information obtained by the adaptation unit 701 includes at least an MPTCP subflow identifier.

Optionally, the MPTCP subflow identifier includes address information of an MPTCP subflow.

In this embodiment, the adaptation unit 701 may be configured to: select one MPTCP subflow according to address information of the at least one MPTCP subflow, where the selected MPTCP subflow carries all the HTTP/2 frames belonging to the same HTTP/2 stream; and send the at least one HTTP/2 frame and address information of the selected MPTCP subflow to the transmission unit 702.

Correspondingly, the transmission unit 702 may be configured to allocate all the HTTP/2 frames belonging to the same HTTP/2 stream to the selected MPTCP subflow for transmission.

Optionally, in another embodiment of the present application, the subflow information obtained by the adaptation unit 701 includes at least a quantity of MPTCP subflows.

In this embodiment, the adaptation unit 701 may be configured to: separately allocate one MPTCP subflow identification number to each MPTCP subflow of the quantity of MPTCP subflows, where the MPTCP subflow identification number indicates a distinction between different MPTCP subflows; make the at least one HTTP/2 frame correspond to one MPTCP subflow identification number; and send the at least one HTTP/2 frame and the corresponding MPTCP subflow identification number to the transmission unit 702.

Correspondingly, the transmission unit 702 may be configured to select one MPTCP subflow, and allocate all the HTTP/2 frames belonging to the same HTTP/2 stream to an MPTCP subflow that carries the identification number for transmission.

Optionally, the adaptation unit 701 may be further configured to identify non-HTTP/2 data, and transparently transmit the non-HTTP/2 data to the transmission unit 702. The transmission unit 702 allocates the non-HTTP/2 data to a corresponding MPTCP subflow for transmission.

Optionally, the communications apparatus may further include a communication unit, configured to perform an information exchange with another communication device such as a peer device.

According to the communications apparatus provided in this embodiment of the present application, based on the stream identifier of the HTTP/2 stream and the information about the at least one MPTCP subflow of the same MPTCP connection, all the frames belonging to the same HTTP/2 stream are allocated to the same MPTCP subflow for transmission, so that a data throughput is large, and system robustness is good, thereby improving HTTP/2 stream transmission performance. Further, an intermediate parsing node on an MPTCP subflow between a client and a server can receive all frames belonging to a same HTTP/2 stream, thereby completing HTTP/2 service parsing processing.

Figure 8:
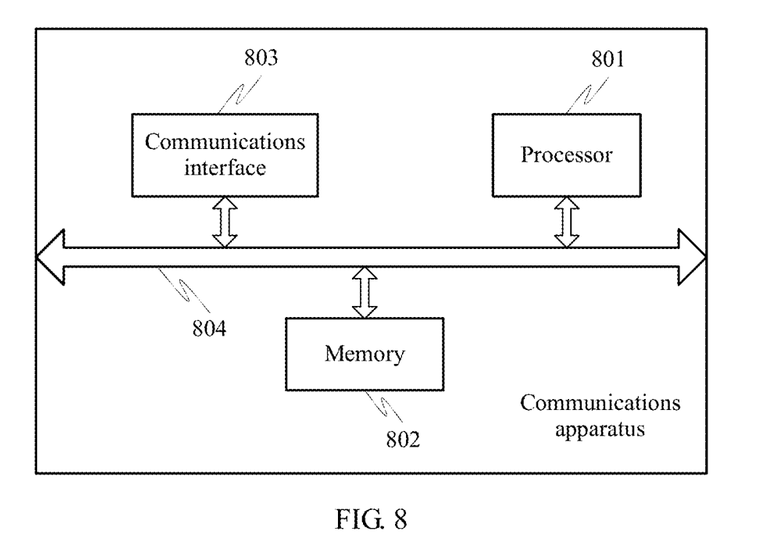
FIG. 8 is a schematic structural diagram of a communications apparatus according to an embodiment of the present application.

As shown in FIG. 8, an embodiment of the present application further provides a communications apparatus, configured to communicate with a peer apparatus. The apparatus includes a processor 801 and a memory 802.

The apparatus may further include a communications interface 803 and a system bus 804. The processor 801, the memory 802, and the communications interface 803 are connected and complete mutual communication by using the system bus 804.

The processor 801 may be a multi-core processor, at least two processors that are geographically distributed and connected by using a communication link, a central processing unit (CPU), a digital signal processor (DSP), or another specialized processor.

The memory 802 may be various memories/media in the prior art such as a flash memory or a random access memory (RAM). This is not particularly limited herein. It can be understood that the memory 802 may be a single storage device, or may be at least two memories that are geographically distributed and connected by using a communication link.

The communications interface 803 may be used for an information exchange between the communications apparatus and another communications apparatus.

The memory 802 stores a group of program code. The processor 801 is configured to invoke the program code stored in the memory 802. The program code includes the following function modules:

an adaptation module, configured to determine to match all HTTP/2 frames belonging to a same HTTP/2 stream to a same MPTCP subflow; and a transmission module, configured to add, according to an instruction of the adaptation module, all the HTTP/2 frames belonging to the same HTTP/2 stream to one MPTCP subflow for transmission, where an MPTCP connection to which the MPTCP subflow belongs has at least one MPTCP subflow.

Optionally, in an implementation of the present application, the adaptation module may include an identification submodule, configured to identify, according to stream identifiers carried by the HTTP/2 frames, that all the HTTP/2 frames belong to the same HTTP/2 stream.

Optionally, the adaptation module may obtain, by using an interface between the adaptation module and the transmission module, subflow information of at least one MPTCP subflow that belongs to the MPTCP connection, where the subflow information identifies the at least one MPTCP subflow.

Optionally, in an embodiment of the present application, the subflow information obtained by the adaptation module includes at least an MPTCP subflow identifier.

Optionally, the MPTCP subflow identifier includes address information of an MPTCP subflow.

In this embodiment, the adaptation module may be configured to: select one MPTCP subflow according to address information of the at least one MPTCP subflow, where the selected MPTCP subflow carries all the HTTP/2 frames belonging to the same HTTP/2 stream; and send the at least one HTTP/2 frame and address information of the selected MPTCP subflow to the transmission module.

Correspondingly, the transmission module may be configured to allocate all the HTTP/2 frames belonging to the same HTTP/2 stream to the selected MPTCP subflow for transmission.

Optionally, in another embodiment of the present application, the subflow information obtained by the adaptation module includes at least a quantity of MPTCP subflows.

In this embodiment, the adaptation module may be configured to: separately allocate one MPTCP subflow identification number to each MPTCP subflow of the quantity of MPTCP subflows, where the MPTCP subflow identification number indicates a distinction between different MPTCP subflows; make the at least one HTTP/2 frame correspond to one MPTCP subflow identification number; and send the at least one HTTP/2 frame and the corresponding MPTCP subflow identification number to the transmission module.

Correspondingly, the transmission module may be configured to select one MPTCP subflow, and allocate all the HTTP/2 frames belonging to the same HTTP/2 stream to an MPTCP subflow that carries the identification number for transmission.

Optionally, the adaptation module may be further configured to identify non-HTTP/2 data, and transparently transmit the non-HTTP/2 data to the transmission module. The transmission module allocates the non-HTTP/2 data to a corresponding MPTCP subflow for transmission.

It can be understood that the communications apparatus provided in this embodiment of the present application may further include but is not limited to: one or more of a transceiver, a power unit, a transfer part, an alarm part, an antenna feeder part, and an operation and maintenance part. A person of ordinary skill in the art may understand that the communication device may have different components according to different implementations. This is not limited in this embodiment of the present application.

It should be noted that the communications apparatus provided in this embodiment of the present application may be configured to control HTTP/2 stream transmission. The apparatus may be an independently-disposed apparatus, and serves as a client or a server to communicate with a peer apparatus. Alternatively, the apparatus may be deployed in another communication device as a control module, for example, deployed in the client or the server. This is not limited in this embodiment of the present application. For example, the apparatus may be deployed in an access control device such as a BSC, an RNC, or an AC as a control module; deployed in an access device such as a BTS, a NodeB, an e-NodeB, or an AP as a control module; deployed in a terminal device such as UE as a control module; or may be the control device, the access device, or the terminal device itself.

According to the communications apparatus provided in this embodiment of the present application, based on the stream identifier of the HTTP/2 stream and the information about the at least one MPTCP subflow of the same MPTCP connection, all the frames belonging to the same HTTP/2 stream are allocated to the same MPTCP subflow for transmission, so that a data throughput is large, and system robustness is good, thereby improving HTTP/2 stream transmission performance. Further, an intermediate parsing node on an MPTCP subflow between a client and a server can receive all frames belonging to a same HTTP/2 stream, thereby completing HTTP/2 service parsing processing.

It may be clearly understood by a person skilled in the art that, for the purpose of convenient and brief description, for a function and performed steps of the communications apparatus provided in this embodiment of the present application, reference may be made to a related description of the method embodiment of the present application, and details are not described herein.

Based on the foregoing descriptions of the embodiments, a person skilled in the art may clearly understand that the present application may be implemented by software in addition to a necessary universal hardware platform or by hardware only. In most circumstances, the former is a preferred implementation. Based on such an understanding, the technical solutions of the present application essentially, or the part contributing to the prior art may be implemented in the form of a software product.

An embodiment of the present application further provides a computer software product.

The computer software product may be stored in a storage medium. The computer software product includes several instructions for instructing a computer device (which may be a personal computer, a server, or a network device) to perform all or some of the steps of the methods described in the embodiments of the present application. The foregoing storage medium may be nonvolatile, for example, may include: any medium that can store program code, such as a USB flash drive, a removable hard disk, a read-only memory (ROM), a random access memory (RAM), a magnetic disk, or an optical disc.

In the several embodiments provided in this application, it should be understood that the disclosed apparatus and method may be implemented in other manners without departing from the scope of this application. For example, the described apparatus embodiment is merely an example. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present application without creative efforts.

In addition, the apparatus and method described herein, and schematic diagrams of different embodiments can be combined or integrated with other systems, modules, technologies, or methods without departing from the scope of this application. In addition, the displayed or discussed mutual couplings or direct couplings or communication connections may be implemented through some interfaces. The indirect couplings or communication connections between the base stations or units may be implemented in electronic, mechanical, or other forms.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data transmission method, wherein the method is applicable to a communications apparatus, and a protocol stack of the communications apparatus comprises a Hypertext Transfer Protocol (HTTP/2) adaptation layer and a Multipath Transmission Control Protocol (MPTCP) layer, wherein the data transmission method comprises:
    matching, by the HTTP/2 adaptation layer, all HTTP/2 frames belonging to a same HTTP/2 stream to a same MPTCP subflow; and
    adding, by the MPTCP layer according to an instruction of the HTTP/2 adaptation layer, all the HTTP/2 frames belonging to the same HTTP/2 stream to one MPTCP subflow for transmission, wherein an MPTCP connection to which the MPTCP subflow belongs has at least one MPTCP subflow.

2. The method according to claim 1, further comprising:
    identifying, by the HTTP/2 adaptation layer according to stream identifiers carried by HTTP/2 frames, that all the HTTP/2 frames belong to the same HTTP/2 stream.

3. The method according to claim 1, further comprising:
    obtaining, by the HTTP/2 adaptation layer by using an interface between the HTTP/2 adaptation layer and the MPTCP layer, subflow information of the at least one MPTCP subflow that belongs to the MPTCP connection, wherein the subflow information identifies the at least one MPTCP subflow.

4. The method according to claim 3, wherein
    the subflow information comprises an MPTCP subflow identifier.

5. The method according to claim 4, wherein
    the MPTCP subflow identifier comprises address information of an MPTCP subflow; and, wherein
    matching, by the HTTP/2 adaptation layer, all HTTP/2 frames belonging to the same HTTP/2 stream to the same MPTCP subflow comprises:
    selecting, by the HTTP/2 adaptation layer, one MPTCP subflow according to address information of the at least one MPTCP subflow, wherein the selected MPTCP subflow carries all the HTTP/2 frames belonging to the same HTTP/2 stream; and
    sending the HTTP/2 frames and the address information of the selected MPTCP subflow to the MPTCP layer; and, wherein
    adding, by the MPTCP layer according to an instruction of the HTTP/2 adaptation layer, all the HTTP/2 frames belonging to the same HTTP/2 stream to the one MPTCP subflow for the transmission comprises:
    adding, by the MPTCP layer, all the HTTP/2 frames belonging to the same HTTP/2 stream to the selected MPTCP subflow for transmission.

6. The method according to claim 3, wherein information about the MPTCP subflow comprises a quantity of MPTCP subflows.

7. The method according to claim 6, wherein
matching, by the HTTP/2 adaptation layer, all HTTP/2 frames belonging to the same HTTP/2 stream to the same MPTCP subflow comprises:
separately allocating, by the HTTP/2 adaptation layer, one MPTCP subflow identification number to each MPTCP subflow of the MPTCP subflows corresponding to the quantity of MPTCP subflows, wherein the MPTCP subflow identification number indicates a distinction between different MPTCP subflows;
making all the HTTP/2 frames belonging to the same HTTP/2 stream to correspond to one MPTCP subflow identification number; and
sending the HTTP/2 frames and the corresponding MPTCP subflow identification number to the MPTCP layer; and, wherein
adding, by the MPTCP layer according to an instruction of the HTTP/2 adaptation layer, all the HTTP/2 frames belonging to the same HTTP/2 stream to one MPTCP subflow for transmission comprises:
selecting, by the MPTCP layer, one MPTCP subflow to correspond to the MPTCP subflow identification number; and
allocating all the HTTP/2 frames belonging to the same HTTP/2 stream to the MPTCP subflow corresponding to the MPTCP subflow identification number for transmission.

8. A communications apparatus, wherein the apparatus is configured to communicate with a peer apparatus, and comprises a processor and a memory; and
the memory is configured to store a group of program code, and the processor is configured to invoke the program code stored in the memory to match all Hypertext Transfer Protocol (HTTP/2) frames belonging to a same HTTP/2 stream to a same Multipath Transmission Control Protocol (MPTCP) subflow; and
add all the HTTP/2 frames belonging to the same HTTP/2 stream to one MPTCP subflow for transmission, wherein an MPTCP connection to which the MPTCP subflow belongs has at least one MPTCP subflow.

9. The apparatus according to claim 8, wherein the processor is configured to invoke the program code store in the memory to:
identify, according to stream identifiers carried by HTTP/2 frames, that all the HTTP/2 frames belong to the same HTTP/2 stream.

10. The apparatus according to claim 8, wherein the processor is configured to invoke the program code store in the memory to
obtain subflow information of at least one MPTCP subflow that belongs to the MPTCP connection, wherein the subflow information identifies the at least one MPTCP subflow.

11. The apparatus according to claim 10, wherein
the subflow information comprises an MPTCP subflow identifier.

12. The apparatus according to claim 11, wherein
the MPTCP subflow identifier comprises address information of an MPTCP subflow; and, wherein
the processor is configured to invoke the program code store in the memory to:
select one MPTCP subflow according to address information of the at least one MPTCP subflow; and
add all the HTTP/2 frames belonging to the same HTTP/2 stream to the selected MPTCP subflow for transmission.

13. The apparatus according to claim 10, wherein information about the MPTCP subflow comprises a quantity of MPTCP subflows.

14. The apparatus according to claim 13, wherein the processor is configured to invoke the program code store in the memory to
separately allocate one MPTCP subflow identification number to each MPTCP subflow of the MPTCP subflows corresponding to the quantity of MPTCP subflows, wherein the MPTCP subflow identification number indicates a distinction between different MPTCP subflows;
make all the HTTP/2 frames belonging to the same HTTP/2 stream to correspond to one MPTCP subflow identification number;
select one MPTCP subflow to correspond to the MPTCP subflow identification number; and
allocate all the HTTP/2 frames belonging to the same HTTP/2 stream to the MPTCP subflow corresponding to the MPTCP subflow identification number for transmission.

15. A non-transitory processor-readable medium having processor-executable instructions stored thereon for a communications apparatus, and a protocol stack of the communications apparatus comprises a Hypertext Transfer Protocol (HTTP/2) adaptation layer and a Multipath Transmission Control Protocol (MPTCP) layer,
the processor-executable instructions, when executed by a processor, for causing the apparatus to perform the following:
matching, by the HTTP/2 adaptation layer, all HTTP/2 frames belonging to a same HTTP/2 stream to a same MPTCP subflow; and
adding, by the MPTCP layer according to an instruction of the HTTP/2 adaptation layer, all the HTTP/2 frames belonging to the same HTTP/2 stream to one MPTCP subflow for transmission, wherein an MPTCP connection to which the MPTCP subflow belongs has at least one MPTCP subflow.

16. The non-transitory processor-readable medium according to claim 15, further comprising instructions, when executed by the processor, for causing the apparatus to:
identify, by the HTTP/2 adaptation layer according to stream identifiers carried by HTTP/2 frames, that all the HTTP/2 frames belong to the same HTTP/2 stream.

17. The non-transitory processor-readable medium according to claim 16, further comprising instructions, when executed by the processor, for causing the apparatus to:
obtain, by the HTTP/2 adaptation layer by using an interface between the HTTP/2 adaptation layer and the MPTCP layer, subflow information of at least one MPTCP subflow that belongs to the MPTCP connection, wherein the subflow information identifies the at least one MPTCP subflow.

18. The non-transitory processor-readable medium according to claim 17, wherein the subflow information comprises at least one of an MPTCP subflow identifier and a quantity of MPTCP subflows.

19. The non-transitory processor-readable medium according to claim 15, further comprising instructions, when executed by the processor, for causing the apparatus to:
obtain, by the HTTP/2 adaptation layer by using an interface between the HTTP/2 adaptation layer and the MPTCP layer, subflow information of at least one MPTCP subflow that belongs to the MPTCP connection, wherein the subflow information identifies the at least one MPTCP subflow.

* * * * *